United States Patent [19]

Fike, Jr.

[11] 4,207,913

[45] Jun. 17, 1980

[54] LOW BURST PRESSURE CORROSION RESISTANT RUPTURE DISC ASSEMBLY

[75] Inventor: Lester L. Fike, Jr., Blue Springs, Mo.

[73] Assignee: Fike Metal Products Corporation, Blue Springs, Mich.

[21] Appl. No.: 871,204

[22] Filed: Jan. 23, 1978

[51] Int. Cl.² ............................................. F16K 17/40
[52] U.S. Cl. ................................ 137/68 R; 220/89 A
[58] Field of Search .................. 137/68 R, 69, 70, 71; 220/89 A

[56] References Cited

U.S. PATENT DOCUMENTS

| | | | |
|---|---|---|---|
| 2,487,104 | 11/1949 | Cooper | 220/89 A |
| 2,552,110 | 5/1951 | Otis et al. | 220/89 A |
| 2,766,904 | 10/1956 | Philip | 220/89 A |
| 2,875,921 | 3/1959 | Coffman | 220/89 A |
| 3,109,554 | 11/1963 | Porter et al. | 220/89 A |
| 3,722,734 | 3/1973 | Raidl | 137/68 R X |

Primary Examiner—Alan Cohan
Assistant Examiner—Richard Gerard
Attorney, Agent, or Firm—Schmidt, Johnson, Hovey & Williams

[57] ABSTRACT

A non-fragmenting, low burst pressure rupture device assembly is provided for mounting between opposed flange members which define a relief orifice for a pressurized line or vessel. The assembly includes a relatively thin, flexible, fluid impervious sealing element adapted to be carried by the flange members in fluid blocking relationship to the orifice, along with a support member adapted to be mounted in supporting relationship to the element downstream of the pressure line or vessel. The support member has a series of relieved areas therein defining a closed loop pattern presenting a section which gives way or opens under a pre-determined pressure thereon applied through the sealing element from the pressurized area. The element has an integral bulge defining part overlying the perimeter of the section which allows the section of the support member to sense the pressure in the line or vessel through the sealing element independent of the burst pressure characteristics of the sealing element. A plate secured to the sealing element on the face thereof opposed to the support member moves with and assures full rupture of the sealing element concomitantly with opening of the section of the support member.

7 Claims, 18 Drawing Figures

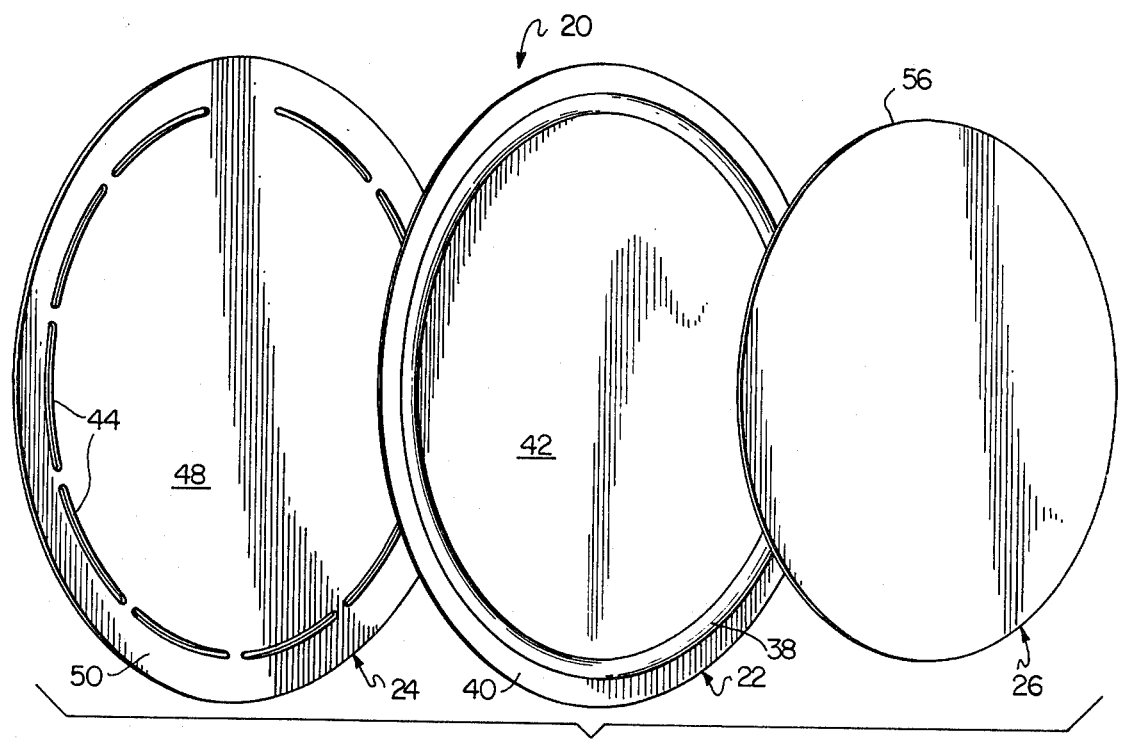
FIG. 1
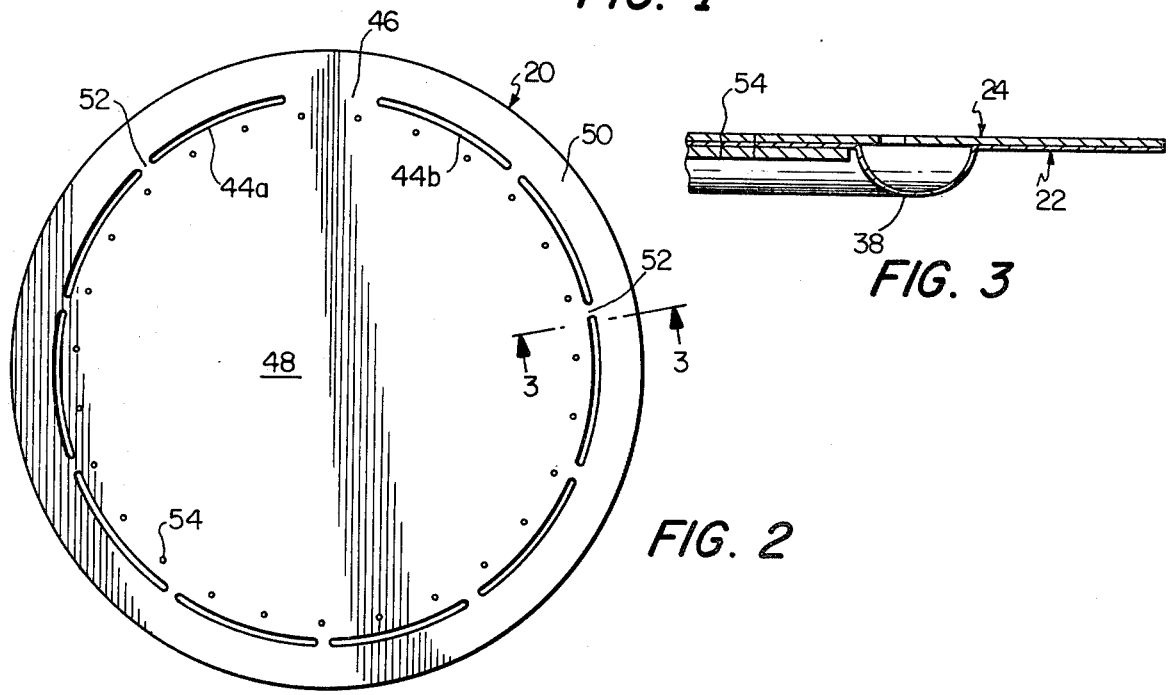
FIG. 2
FIG. 3
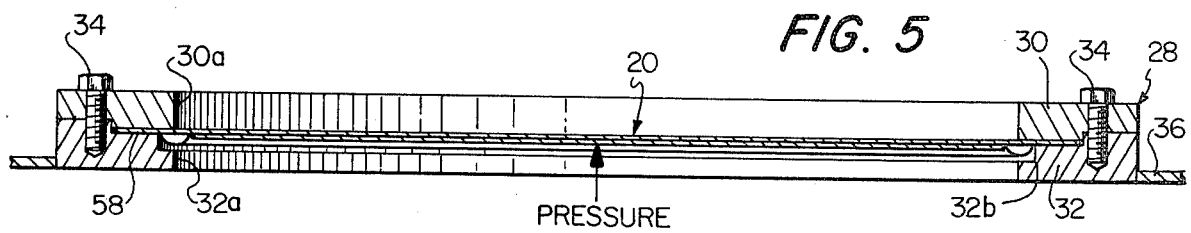
FIG. 5

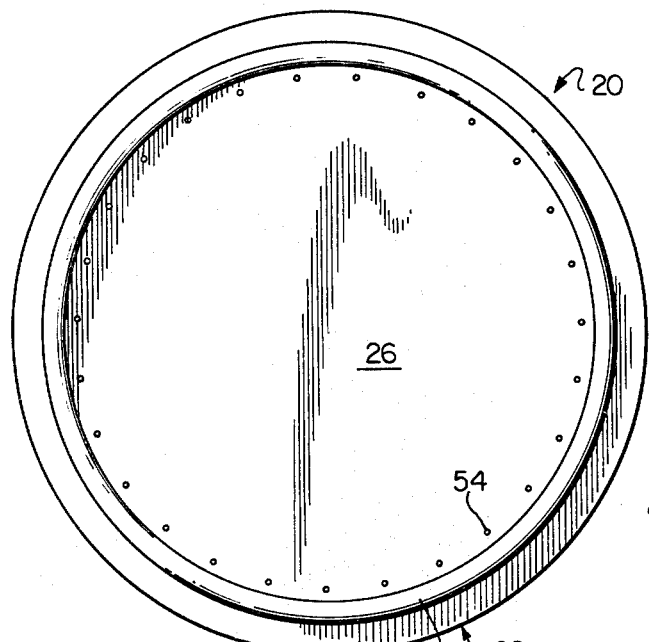
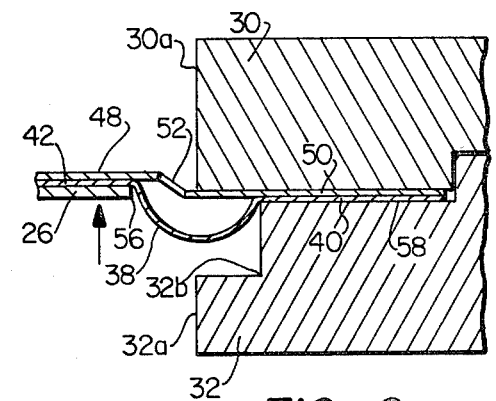
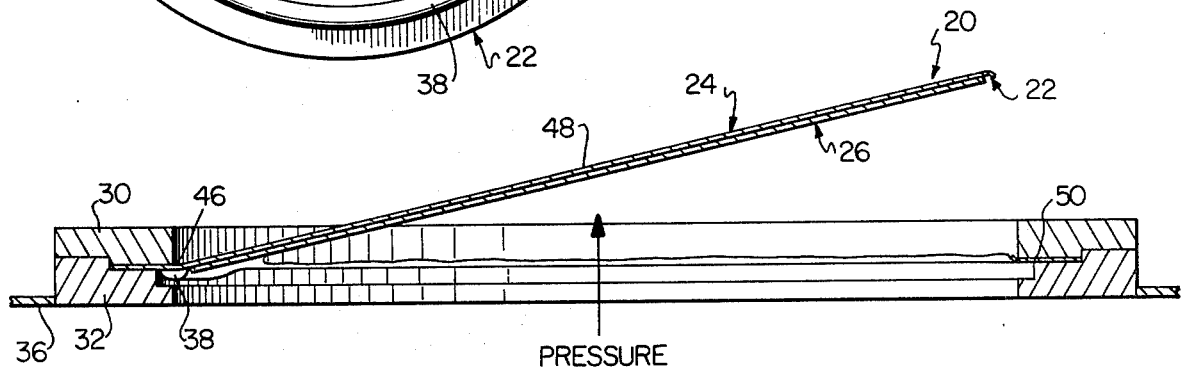
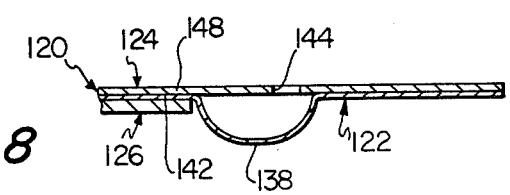
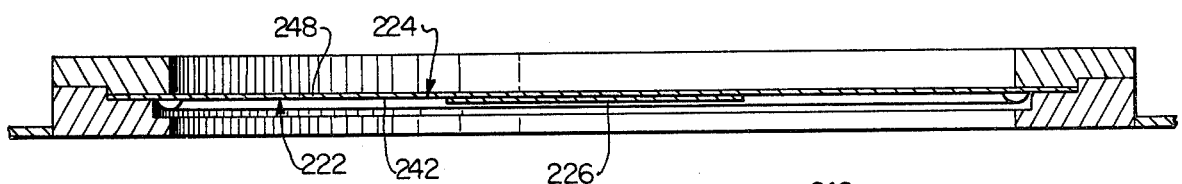
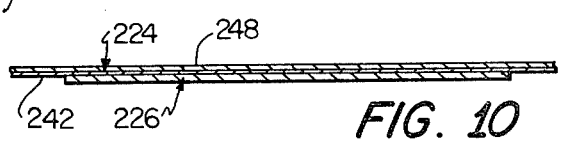
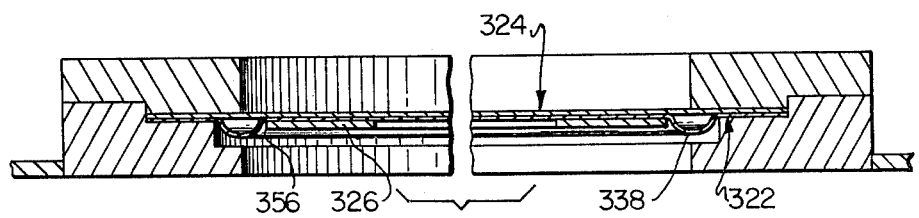

LOW BURST PRESSURE CORROSION RESISTANT RUPTURE DISC ASSEMBLY

This invention relates to a non-fragmenting, low burst pressure rupture device adapted to be mounted in the relief orifice of a pressurized line or vessel. Although rupture discs have found widespread acceptance for positively relieving pressure from confined areas without the problems attendant in the use of mechanical relief valves, difficulties have been encountered in providing discs which will burst at a relatively low pressure not only from the standpoint of rupture at minimum pressure tolerances but also in a highly predictable manner. The same is true with respect to other pressure relieving panel shapes such as those of rectangular, triangular or multi-sided configuration.

In a typical rupture disc installation, releasably interconnected flanges define a relief orifice or passage that is normally blocked by the disc but is opened for free flow of fluid therethrough on rupture of the disc at a preselected, design pressure. For the most part, these discs have comprised initially planar metal or synthetic resin sheets which are prebulged to present opposed concaval-convex surfaces. The discs are mounted in the support flange structure so that pressure is applied to the concave surface of the disc thereby placing the bulged area of the relief device under a tensile load. When the tensile strength of the dome-shaped area of the disc is exceeded, the protective device ruptures relieving the pressure from the confined area downwstream thereof. Oftentimes score lines are provided in the bulged area of the disc, usually in a cross-shaped pattern to provide a more predictable resistance to bursting and also minimizing fragmentation because of the way in which the disc tends to open in the form of four petal sections. It is to be appreciated that scoring of the metal allows thicker material to be used for greater structural integrity and resistance advantage yet allowing opening of the disc at a lower pressure. The depth of the score lines control the burst pressure of the disc.

So-called reverse acting rupture disc assemblies are also in conventional use wherein the prebulged rupture diaphragm is placed in the flange with the convex surface thereof facing the pressure zone so that when the fluid pressure in the area protected rises to a level which causes the disc to deflect and turn inside out, a sharpened knife or piercing member located downstream of the disc serves to sever and thereby rupture the frangible member as it reverses its shape.

Although both of the devices described have found utility in many applications, they have limitations in many instances not only because of the relatively high cost of the overall assemblies, but particularly the fact that such cost tends to increase substantially when fabrication materials are used which are resistant to corrosive atmospheres. It is desirable in this case to use metal frangible members as the rupture disc elements but either the materials which have greatest resistance to corrosion for a particular system are prohibitively expensive, or require the use of synthetic resin sheets which do not have adequate imperviousness to withstand fluid leakage therethrough. The problem is compounded all the more when design factors require provision of a rupture disc assembly which will relieve a confined area at a relatively low pressure within a narrow operating range.

It is therefore the primary object of the present invention to provide a non-fragmenting, low burst pressure rupture device assembly which overcomes the problems inherent with prior units in that a relatively thin, flexible, fluid impervious, corrosion resistant sealing element is used to block release of pressure from a line or vessel and wherein a support member is provided in the flange structure downstream of the sealing element and in supporting relationship thereto of construction and cooperable with the sealing element in a manner such that opening of the support member under pressure transmitted thereto through the sealing element is independent of the burst characteristics of the sealing diaphragm thus permitting the burst pressure of the assembly to be accurately controlled even at low pressures utilizing materials which are highly resistant to corrosion in the atmosphere where protection is required.

A further important object of the invention is to provide a rupture device assembly as described wherein unique means is provided in operable association with the sealing element to assure full rupture thereof concomitantly with opening of the support element so that free flow of fluid through the relief orifice is obtained even though the device is subject to rupture at a relatively low pressure.

A still further important object of the invention is to provide an assembly of the characteristics defined above which can be manufactured and distributed at a minimum cost not only by virtue of the fact that the sealing element may be of relatively thin material which is resistant to the corrosive atmosphere of the system to be protected but opens at a very predictable pressure by virtue of the burst parameters of the support member therefor, but in addition, costs are minimized by virtue of the fact that all of the components may be fabricated and assembled as essentially flat pieces thus avoiding the necessity of prebulging rupture diaphragms and the like to a very controlled and precise extent as has been necessary in the part. In this connection, a corollary to the foregoing object is the fact that although the preferred embodiment of the invention involves forming a ridge of transversely U-shaped configuration in the sealing element of a size to complementally overlie the margin of a section of the support member which is designed to give way when the device ruptures, this forming procedure is not as costly as prebulging of discs since the sealing element is of relatively thin material making displacement of a portion thereof a simple procedure and also avoiding the necessity of doing so under very precise conditions which assure rupture of the device at a pre-determined prescribed over pressure.

Another important object of the invention is to provide a rupture device assembly of the preceding features which lends itself to incorporation of a relatively inexpensive and problem free vacuum support which precludes reverse movement of the sealing element or the support member therefor under negative pressure conditions notwithstanding the fact that the entire assembly is used in a normally highly corrosive atmosphere.

Also an important object of the invention is to provide a rupture device assembly wherein the support member for the relatively thin sealing element has slot means therein defining the section which opens on rupture and wherein the slots terminate in spaced relationship presenting a hinge so that upon opening of the support member there is no fragmentation thereof and ejection of material from the orifice defining flange structure is precluded by virtue of the fact that the portion of the sealing element overlying the support member section is rigidly affixed to the latter and opens therewith.

A particularly important object of the invention is to provide a rupture device assembly wherein burst pressures from one-fourth to one-third of those previously obtainable with corrosion resistant materials of the type used in fabricating the structure hereof are employed, by virtue of the fact that the sealing member which must resist the corrosive effect of the atmosphere within the line or vessel being protected is fabricatable of relatively thin sheet material but is supported by a component that can be constructed to open at a very low, highly definable burst parameter independent of and unaffected by the burst pressure characteristics of the sealing element itself.

Other objects of the invention will become obvious or be explained in greater detail as the following specification progresses.

In the drawings:

FIG. 1 is an exploded view of a preferred form of rupture disc assembly embodying the concepts of the invention and showing from left to right, the sealing element support member, the sealing element, and the plate which assures full opening of the sealing element;

FIG. 2 is a top view of the components of FIG. 1 in assembled relationship and on a somewhat larger scale than the preceding figure;

FIG. 3 is a fragmentary enlarged cross-sectional view taken on the line 33 of FIG. 2;

FIG. 4 is a bottom view of the assembly depicted in FIG. 2;

FIG. 5 is a fragmentary, somewhat schematic showing of flange structure defining a fluid orifice or passage leading from a confined area such as a line or vessel and illustrating the way in which the assembly of FIGS. 2 and 4 is normally mounted in the orifice of the flange structure in fluid blocking relationship thereto;

FIG. 6 is a fragmentary, enlarged, somewhat exaggerated cross-sectional view of the right hand portion of FIG. 5 and illustrating the way in which the disc assembly components are slightly deflected by pressure in the confined area protected thereby;

FIG. 7 is a fragmentary vertical cross-sectional view similar to FIG. 5 and showing the rupture disc components thereof during opening of the same and illustrating the non-fragmenting nature of such rupture;

FIG. 8 is an enlarged fragmentary vertical cross-sectional view of one edge portion of the assembly as depicted in FIGS. 2 and 3 but showing a modified form of the assembly best illustrated in FIG. 3 wherein the flexible ridge provided in the sealing element is located in a somewhat different orientation relative to the relieved area defining slots of the support member for the sealing element;

FIG. 9 is a vertical cross-sectional view similar to FIG. 5 but showing a modified form of the rupture disc assembly wherein the plate which is mounted on the inner face of the sealing element and assures full opening thereof is of somewhat smaller size than the plate of the preferred form as shown in FIGS. 1-5 inclusive;

FIG. 10 is an enlarged fragmentary vertical cross-sectional view through the central part of the rupture disc assembly illustrated in FIG. 9;

FIG. 11 is a somewhat enlarged, fragmentary vertical cross-sectional view of another form of the invention illustrating a still different embodiment of the plate for assuring full opening of the sealing member and in this instance comprising an annulus mounted on the inner face of the sealing element;

Figure 18:
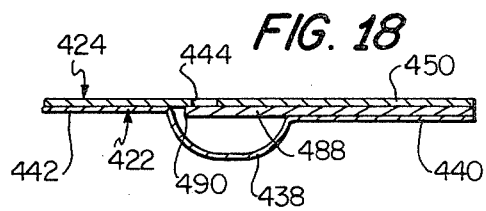
Figure 17:
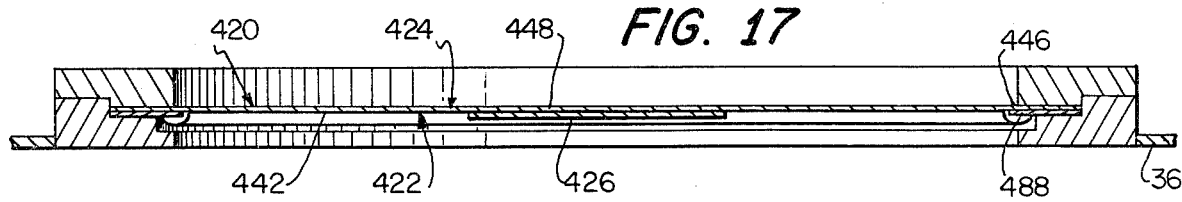

FIG. 17 is a fragmentary vertical cross-sectional view of another embodiment of the present invention illustrating a shear plate in association with the sealing element and a fluid pervious support member therefor, along with a smaller plate on the inner face of the sealing element to assure full opening thereof; and FIG. 18 is a fragmentary enlarged vertical cross-sectional view through the right hand side of the disc assembly as shown in FIG. 17.

Referring initially to FIGS. 1-7 inclusive, the preferred rupture device assembly is broadly designated by the numeral 20 and includes as principal components, a central, relatively thin, frangible, fluid impervious, generally planar sealing element 22 which for illustrative purposes only is shown as being of circular configuration and normally supported by a disc-shaped metallic support member 24 adapted to overlie the normally outermost face of element 22. A plate 26 is provided on the inner face of sealing element 22 to assure full rupture of the latter upon opening of number 24 as will be explained.

As best shown in FIGS. 5-7, rupture device assembly 20 is adapted to be mounted in flange structure 28 or the like which conventionally includes a pair of flange members 30 and 32 releasably interconnected by a series of bolts 34. Again for illustration purposes only, flange member 32 is shown as being mounted on structure 36 comprising a pressure vessel, conduit, or other confined area having a pressurized fluid maintained therein or flowing therethrough. Flange members 30 and 32 have inner surfaces 30a and 32a respectively which cooperate to present an orifice communicating the interior of structure 36 with a zone into which the confined fluid is to be vented. In many instances, the atmosphere in structure 36 is of a corrosive nature requiring use of materials in the fabrication of those elements exposed thereto, which are resistant to the confined area environment.

Although the flange members 30 and 32 may take any desired form for a particular application, in an especially useful configuration, member 32 may be provided with an inwardly facing, peripherally extending notch 32b which underlies an adjacent section of the bottom surface of flange member 30.

Sealing element 22, which in the preferred form thereof as illustrated in FIGS. 1-7 inclusive is of circular configuration, normally comprises a relatively thin sheet of corrosion resistant material which has a long useful life. In many instances this can comprise a corrosion resistant metal of a thickness of the order of 0.002 inch. Rarely will it be necessary to employ sheet material exceeding 0.01 in. Exemplary materials for fabrication of the sealing element 22 include stainless steel (type 316 being exemplary), gold, platinum, silver, tantallum, titanium, zirconium, columbium, Hasteloy B and C, a product of the Stellite division of Union Carbide Company, the Inconels, aluminum, nickel and Monel as well as Teflon, polyvinyl chloride, propylene, polyethelene, and Saran type synthetic resin materials.

From a cost standpoint it is desirable and in many instances with more expensive metals essential that the sealing element be of relatively thin material. One important advantage of the present invention is the fact that the rupture pressure of assembly 20 is determined by the construction and characteristics of support member 24 rather than the sealing element. Therefore the manufacturer of the rupture disc assembly may purchase material for fabrication of element 22 of a thickness that is readily available on the market and use the same in construction of the assembly, provided such sheet material when subjected to a peripheral snap action force, will in fact rupture at the pre-determined pressure established for opening of support member 24. To this end, the frangible sealing element 22 is provided with an integral bulged or displaced part 38 which is, in its preferred form, transversely U-shaped or the equivalent in cross-section as depicted in FIG. 3, thereby separating the peripheral edge section 40 of the disc from the central planar portion 42 thereof. Normally, the ridge defining part 38 of sealing element 22 extends around the entire perimeter of the disc and is of the same thickness as edge section 40 and planar portion 42, merely having been displaced from the main plane of the material by a suitable forming tool or die. It is noteworthy in this respect that no precision tooling is required in this respect since it is necessary only to push the material which ultimately defines ridge 38 out of the plane of the sheet. The burst pressure of the sealing element is not dependent on the specific thickness of this ridge as is the case with concaval-convex rupture discs of the prior art, and as a result there is no need to take special precautions during such deformation of the sheet material to assure that the thickness stays exactly the same as the original thickness, recalling in this regard that the sheet is normally only a few thousands thick.

Support member 24 for sealing element 22 also comprises a disc-shaped component generally formed of relatively rigid, preferably corrosion resistant material such as stainless steel and in preferred instances a thickness of about 0.015 to 0.02 inch. Preferred embodiments have been fabricated using type 316 stainless steel of 0.018 inch thickness.

Support member 24 has a series of relieved areas presenting interrupted slots 44 which define a circular pattern that lies inside of the surface 30a of flange number 30 when rupture device assembly 20 is mounted in flange structure 28. It is to be noted from FIGS. 1 and 2 that the end slots 44a and 44b terminate in greater spaced relationship from one another than adjacent slots to present what amounts to a hinge segment 46 joining the central section 48 of support member 24 to the peripheral edge section 50. Section 48 opens upon rupture of support member 24 as the tabs 52 between all of the slots 44 with the exception of hinge segment 46, give way to allow opening of the assembly 20.

It is to be pointed out in this respect that the pressure at which rupture device assembly 20 opens may be accurately controlled by precise calculation of the length of the tabs 52 in relation to the type of material used in fabricating support member 24 as well as the thickness thereof. By selecting appropriate tab lengths correlated with material thickness, the support member 24 may be constructed to open at any one of an infinite number of low level burst pressures within a pre-determined range. Use of programmable punch machines and the like which allow cutting of slots leaving tabs within tolerance lengths of 0.001 inch permit fabrication of support member 24 at a relatively low cost while at the same time assuring opening pressures for section 48 which are very accurately controllable to prescribed low level pressure values.

It is also evident from FIG. 3 that the sealing element 22 is positioned behind support member 48 in normal use and that the ridge part 38 is aligned with and underlies the circular pattern defined by slots 44. Furthermore, it is to be observed that the bulged part 38 projects in a direction away from the plane of support member 24.

In its preferred form, assembly 20 also includes a plate 26 which underlies the face of sealing element 22 opposed to support member 24 and as shown in FIGS. 3 and 4, plate 26, the planar portion 42 of sealing element 22 and section 48 of support member 24 are all integrally interconnected for simultaneous movement by virtue of spot weldments 54, rivets or equivalent interconnecting means therebetween such as adhesive lines or spots. It is also to be seen in FIGS. 5 and 6 that the peripheral edge 56 of plate 26 terminates adjacent the ridge 38 of sealing element 22. In the case where support member 24 is fabricated of 0.018 inch thick stainless steel and the sealing element 22 is fabricated of 0.002 metal sheet material, plate 26 may be desirably constructed of 0.03 stainless steel. In this instance spot weld means 54 is advantageously used to integrally join the portions of the laminated assembly which engage one another.

In the use of assembly 20, flange member 30 is removed and the rupture structure placed in the cavity 58 formed in the upwardly facing surface of flange number 32 as shown in FIG. 5. The flange member 30 is then replaced and tightened against flange member 32 using the series of securing bolts 34 or equivalent means to block release of fluid from the confined area defined by structure 36 through the relief orifice presented by flange structure 28. Rupture device assembly 20 is positioned in the flange structure 28 with plate 26 and thereby sealing element 22 facing toward the interior of the pressure vessel or line while support member 24 is outboard of the interior of the confined area. It is therefore desirable that the sealing element 22 as well as plate 26 both be fabricated of material which is resistant to the corrosive atmosphere within structure 36.

Upon pressurization of the interior of structure 36, the section 48 of structure 24 normally displaces slightly as is shown in exaggerated form in FIG. 6 but such movement in no way affects the rupture pressure of the assembly by virtue of the fact that the bulged ridge 38 of sealing element 22 allows the portion 42 thereof to deflect with section 48 as necessary. Furthermore, during any fluctuations in the pressure within structure 36 below the rupture pressure of assembly 20, central portion 42 of sealing element 22 is free to move with section 48 of support member 24 as may be required without in any manner changing the burst characteristics of the overall unit. Furthermore, since sealing element 22 is fabricated in preferred instances of relatively thin sheet material which serves primarily as a means to block release of fluid from structure 36 while resisting any tendency of the atmosphere within the confined area to corrode the pressure sealing components, it is to be recognized that the burst level of assembly 20 is determined solely by the resistance of tabs 52 of support member 24 and not by the inherent burst pressure characteristics of the sealing element 22 notwithstanding the fact that the burst pressure of the latter is typically above that of the cumulative resistance of tabs 52, but in certain instances may be less.

When the pressure within structure 36 reaches a level which can no longer be resisted by the tensile strength of tabs 52, the same give way thereby allowing section 48 to open in a direction as depicted by FIG. 7 causing concomitant rupture of sealing element 22 which is assisted by the mass of shear plate 26 affixed thereto. Also as shown in FIG. 7, the plate 26 acts as a medium to cause the central portion 42 of sealing element 22 to fully open with section 48 of support member 24 by virtue of the fact that the peripheral edge 56 of plate 26 shears sealing element 22 around the inside perimeter of the bulged ridge 38 of the thin frangible sealing element. Thus, the plate 26 performs at least two important functions. First, it acts as a means to force the planar portion 42 of sealing element 22 through the opening left by displacement of section 48 of support member 24 from the main plane thereof upon rupture of assembly 20. Second, it also prevents pinhole opening or line shear of the sealing element when section 48 of the support member gives way. Joinder of plate 26 with central portion 42 of sealing element 22 and with the latter being integrally connected to support member 48, further contributes to opening of the central part of the assembly 20 in the manner shown in FIG. 7 for full release of pressure from the interior of structure 36 throughout the entire area of the orifice defined by flange structure 28. Hinge section 46 of support member 24 is important in this respect in preventing fragmentation of the severed parts of the rupture device assembly during opening thereof and release of such components to an area downstream of the protective device of the surrounding environment.

Tests have confirmed that the burst pressure of rupture device assembly 20 may be as low as 25 percent to 35 percent of conventional metal or composite metal seal discs or panels now available which will resist corrosive atmospheres often encountered in numerous industrial applications. Furthermore, consistent opening of the entire area of the relief orifice is obtained at a very predictable pressure. It was unexpectedly determined during such tests that a rupture device assembly as depicted in FIGS. 1-7 inclusive may be repeatedly subjected to pressures just below the burst point thereof on a cycling basis without significant deterioration in the burst characteristics of the overall assembly. In particular, it was ascertained that a device subjected to the cycling procedures above had exactly the same burst pressure as a disc assembly as described herein which was not cycled. These results are illustrated by the following example:

TEST 1

Thickness Support Member 24
    0.018 316 SS 13⅝ in. O.D.—9 tabs each 0.35 inch wide with hinge section 2 in. long defining inner section 48 of 11 15/16 in. I.D.
Thickness Sealing Element 22
    0.002 Ni
Thickness Plate 26
    0.031 316 SS
Expected Burst Pressure=14 psi
    Assembly 20 was subjected to 3346 pressure cycles where pressure raised in each cycle from atmosphere to an average pressure of 9.35 psi. On the 3347th cycle, the pressure was allowed to continue to rise and the assembly burst at 14.0 psi.

TEST 2

An assembly 20 of the same materials and dimensions as reported in Test 1 was subjected to a single cycle burst pressure. Rupture was obtained at 14.0 psi.

FIG. 8 illustrates a modified form of the invention wherein plate 126 is of somewhat smaller diameter than plate 26 but fits just inside the transversely arcuate ridge 138 of sealing element 122 which is secured to a support member 124 having a series of section defining slots 144 therein. In comparing the rupture device assembly 120 of FIG. 8 with device 20 of FIGS. 1-7 inclusive, it is to be seen that the flexible part 138 which allows central portion 142 of sealing element 122 to move freely with the openable section 148 of support member 124 upon deflection of the section 148, is oriented such that slots 144 are adjacent the outer circular edge of the bulged area. As a consequence, when the burst pressure of the assembly is exceeded, full opening of central portion 142 of sealing element 122 is obtained when section 148 gives way and opens about the hinged segment of the support member. In this instance though, as contrasted with the construction illustrated in FIG. 4, shearing of the sealing element 122 primarily occurs along an arcuate line adjacent the outermost perimeter of the flexible bulged part 138 as the inner section 142 of sealing element 122 is forced through the opening in support member 124 left by dislodgement of section 148 from the plane of the member.

FIGS. 9 and 10 depict an alternate embodiment of the invention wherein the assembly is substantially as shown in FIGS. 1-7 inclusive but in this instance a plate 226 is used which is of substantially smaller diameter than the plate 26 of assembly 20. Plate 226 serves primarily as mass to assure full opening of the portion 242 of sealing element 222 upon opening of section 248 of support member 224 without the edge shearing action of peripheral margin 56 of plate 26.

A further modification of the invention is depicted in FIG. 11 wherein plate 26 of rupture device assembly 20 is replaced by an annulus 326 of essentially the same diameter as plate 26 and functional in essentially the same manner. Here again it is to be noted that the peripheral edge 356 of annular plate 326 terminates adjacent the transversely arcuate ridge 338 of sealing element 322 supported by apertured member 324.

Figure 12:
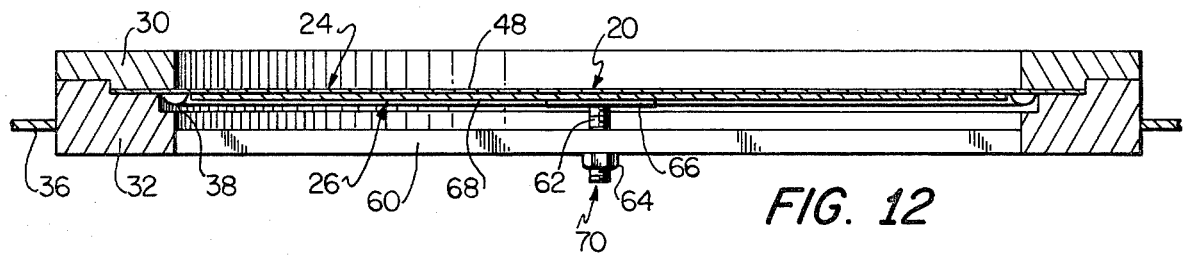
FIG. 12 is a fragmentary vertical cross-sectional view through another embodiment of the invention illustrating a vacuum support for the sealing element and support member therefor comprising in this instance a bar carrying a disc support member thereon.

A vacuum support of preferred construction is illustrated in FIG. 12 of the drawings wherein it can be seen that a bar 60 extends across the width of the opening defined by flange member 32 in spanning relationship to the orifice presented thereby. Bar 60 has a wide heated bolt 62 threaded through the central portion thereof and adjustably fixed in position by a nut 64 which may be drawn up against the underside of the bar 60. Nut 64 is adjustably positioned such that the head 66 thereof directly underlies and engages the proximal face 68 of plate 26 of rupture device assembly 20. The vacuum support 70 thereby defined by the bar and bolt components thus prevents inward movement of the section 48 of support member 24 and central portion 42 of sealing element 22 and plate 26 when vacuum conditions occur within the interior of structure 36.

Figure 13:
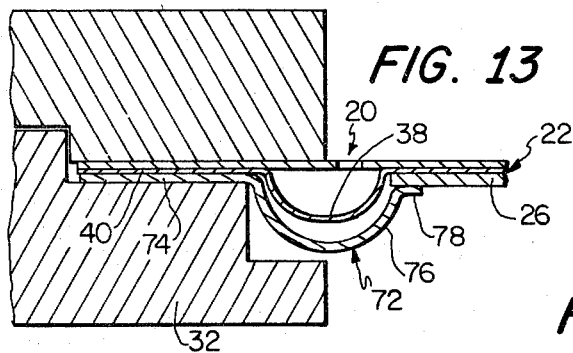
FIG. 13 is an enlarged fragmentary vertical cross-sectional view of the left side of a rupture disc assembly similar to that depicted in FIG. 12 but in this instance illustrating an annular vacuum support in lieu of the bar construction of the preceding figures.
Figure 14:
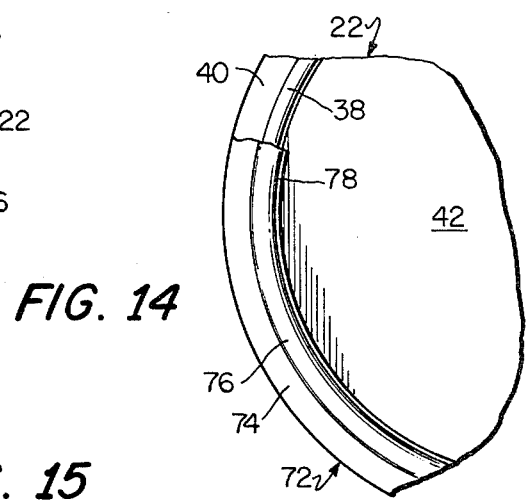
FIG. 14 is a fragmentary bottom view of the disc assembly per se illustrated in FIG. 3 and further showing the annular vacuum support underlying the sealing element.

A further alternate form of vacuum support for rupture device assembly 20 is depicted in FIGS. 13 and 14 wherein it can be seen that the annulus 72 has a rim section 74 adapted to be secured to the edge section 40 of sealing element 22. A central, transversely arcuate, circumferentially extending, groove defining segment 76 of support 72 is configured to clear the bulged part 38 of sealing element 22 while the inner, circular edge section 78 of support 72 is arranged to engage plate 26 in supporting relationship thereto. Here again it can be seen that inward movement of the openable parts of rupture device assembly 20 is effectively precluded by the support annulus.

Figure 15:
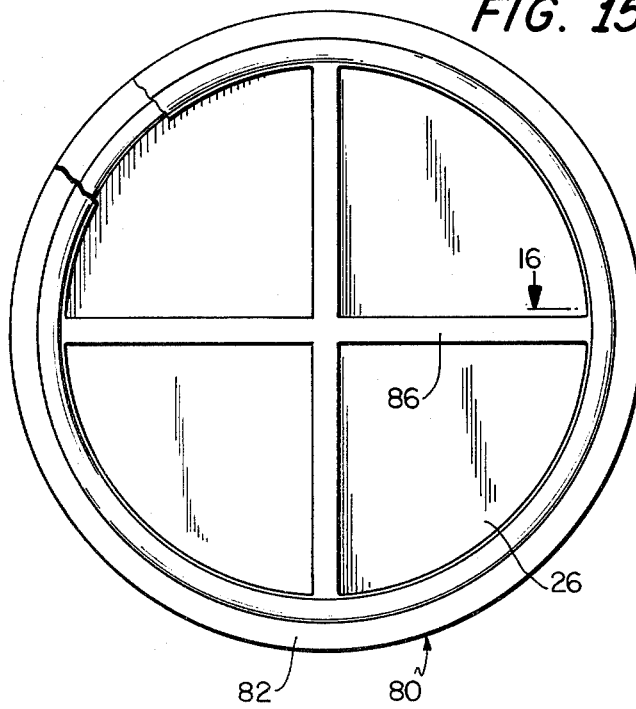
FIG. 15 is a bottom view of another type of vacuum support for the rupture disc assembly of this invention with a portion of the vacuum support being broken away for a better understanding of the configuration of the components thereunder.
Figure 16:
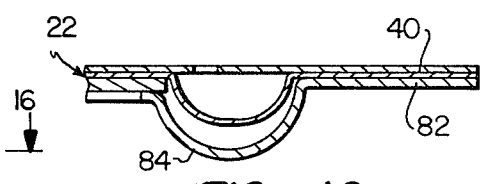
FIG. 16 is a cross-sectional view taken substantially on the line 16—16 of FIG. 15.

In the third type of vacuum support advantageously usable with rupture device assembly 20 as shown in FIGS. 15 and 16, a spider support 80 has a rim edge section 82 secured to the edge section 40 of sealing element 22 while a transversely U-shaped ridge clearing, circular segment 84 integral with rim section 82 and of the same size and dimensions of segment 76 of annular support 72, carries cross-shaped legs 86 which directly underlie and engage plate 26 in supporting relationship thereto. The space between legs 86 permits free flow of fluid from structure 36 through the orifice defined by flange structure 28 so that immediate release of pressure from the confined area is not impeded in any way.

In the modified rupture device assembly 420 of FIGS. 17 and 18, an intermediate annular shear bar 448 is interposed between the edge section 440 of sealing element 422 and the proximal edge section 450 of support member 424. As is best illustrated in FIG. 18, the inner annular edge 490 of shear bar 488 extends inside of the circular line presented by slots 444 in support member 424 but terminates just short of the inner edge of transversely arcuate, circumferentially extending ridge 438 of sealing element 422.

A circular plate 426 affixed to the face of sealing element 422 directly opposite support member 424 is of smaller diameter than plate 26 and serves primarily as means to force the central portion 442 of sealing element 422 through the aperture created by opening of section 448 of the support member 424 upon bursting of rupture device assembly 20. Since the plate 426 is integrally attached to portion 442 of sealing element 422, the plate is driven by the internal pressure within structure 36 through the aperture left by opening of section 448 thereby causing the edge 490 of shear plate 488 to sever sealing element 422 around the entire inner circumference of ridge 438 except that part thereof directly adjacent hinge 446.

Although the preferred embodiments of the invention illustrated in the drawings depict the rupture device assembly as being of circular configuration, it is to be appreciated that the overall shape of the structure is not critical and the concepts hereof apply equally to rectangular, or other polygonal configurations such as triangular shapes, or any other orifice which will receive the fluid blocking assembly. The only requirement is that the configuration be such that slots or other equivalent relief defining means may be formed in the support member to present a section which opens at a pre-determined pressure and desirably remains attached to the rim portion thereof to preclude discharge of fragments into the downstream area. In the case of a pressure relief rectangular rupture device assembly which, for example, may be useful in applications such as air filtering baghouses or similar units, the slots would be formed in the support member in generally rectangular configuration, either of U-shaped leaving a hinge, X-shaped allowing four triangular sections to open, modified X having an elongated central line with opposed, V-defining end lines, or around the entire perimeter if it is desired that the section and accompanying parts of the sealing element and shear plate be discharged from the zone protected.

By virtue of the fact that the rupture device assembly 20 in all of its forms has been found to be highly resistant to cycling without affecting its burst characteristics, it is to be understood that the structure hereof is very competitive with and may serve as a direct replacement for carbon and graphite discs which have been used in the past where there is a requirement for low burst pressure characteristics. Carbon and graphite discs though, suffer from significant disadvantages from the standpoint of the user. An especially irksome problem is the difficulty in mounting carbon or graphite discs in the operating position therefor without rupture (frequently requiring successive replacement until a satisfactory seal without rupture is obtained), and the tendency of such discs to fragment when subjected to repeated vibration and cycling thus necessitating relatively frequent replacement. Furthermore, carbon or graphite discs inherently fragment upon rupture thus causing such material to be discharged downstream of the point of protection.

With assembly 20, shifting of the central portion 42 of sealing element 22 may occur as necessary prior to rupture without any attendant stretching of the thin material defining the sealing element which would affect either its burst properties or ability to withstand a corrosive atmosphere in the area to be protected. Furthermore, when the pressure sensed by support member 24 through sealing element 22 exceeds the tensile limits of tabs 52 in composite, opening of central portion 42 of sealing element 22 occurs in what amounts to snap action motion assisted by the mass of shear plate 26 to obtain clean cut severing of the thin sealing element material without fragmentation.

Furthermore, plastic sealing members may be used of sufficiently fluid impervious properties for the application required and the plate 26 may still be of metal for cost purposes without affecting the ability of the synthetic resin sheet to fully open at the prescribed rupture pressure established for a particular assembly. Support member 24 performs a further important function in this respect in that it precludes prebulging of the plastic membrane under pressure which could ultimately cause failure of the sealing element, especially where pressure cycling conditions are encountered in use.

Having thus described the invention, what is claimed as new and desired to be secured by Letters Patent is:

1. A non-fragmenting, low burst pressure rupture device assembly for mounting between opposed, releasably interconnected flange members presenting a pressure relief orifice for a confined area under pressure, said assembly comprising:

a relatively thin, flexible, fluid impervious sealing element adapted to be mounted between said flange members across said orifice in fluid release blocking relationship to said confined area;

a support member for the element configured to be mounted between said flange members in supporting relationship to the element downstream of the confined area, said support member being provided with relieved areas defining a section which gives way and opens up when the fluid pressure, as sensed by the section by virtue of translation of the fluid pressure to the section through the sealing element bearing thereagainst reaches a pre-determined level only slightly greater than an acceptable operating pressure within said confined area, said element having an integral, peripherally extending deflected part presenting a bulge joining the portion thereof engaging said section of the member with the remainder of the element and extending substantially around the perimeter of said section which allows said portion of the element to freely move with said section during any shifting thereof that may occur upon sensing of pressurization of the area or of fluctuations of pressure therein below said pre-determined level thus assuring that opening of the section by a rise of pressure in said area is substantially independent of and essentially unaffected by the inherent burst pressure characteristics of the sealing element; and plate means secured to the sealing element on the face thereof opposed to said support member and operable to effect full opening of the sealing element upon rupture of said section at least to the extent of the aperture presented by opening of said section.

2. An assembly as set forth in claim 1 wherein is provided means integrally interconnecting said plate means, the portion of the element bearing thereagainst and said section of the support means.

3. An assembly as set forth in claim 1 wherein said support member is provided with a series of interrupted relieved areas in a pattern which defines essentially an endless loop, the relieved areas terminating in sufficiently spaced relationship at one point in the extent thereof to define a hinge flap.

4. An assembly as set forth in claim 1 wherein is provided a plurality of said relieved areas in said support member separated by integral tabs of pre-determined dimensions, the length of each of said tabs controlling the pressure at which the section gives way and opens.

5. An assembly as set forth in claim 1 wherein said section is of generally circular configuration and the plate means is a disc of diameter slightly less than that of the section.

6. An assembly as set forth in claim 1 wherein said sealing element is fabricated of corrosion resistant metallic material of a thickness to burst at a relatively low pressure.

7. An assembly as set forth in claim 1 wherein said section of the support member, the portion of the sealing element in engagement therewith and said plate member on the element are of generally planar configuration.

* * * * *

UNITED STATES PATENT OFFICE
CERTIFICATE OF CORRECTION

Patent No. 4,207,913   Dated June 17, 1980

Inventor(s) Lester L. Fike, Jr.

It is certified that error appears in the above-identified patent and that said Letters Patent are hereby corrected as shown below:

On the title page, left hand column, line 5, delete "Mich." and substitute -- Mo. --.

Signed and Sealed this

Ninth Day of December 1980

[SEAL]

Attest:

Attesting Officer

SIDNEY A. DIAMOND

Commissioner of Patents and Trademarks